July 17, 1934.  R. L. RABY ET AL  1,966,766
TIRE CHANGING MACHINE
Filed April 7, 1933  3 Sheets-Sheet 1
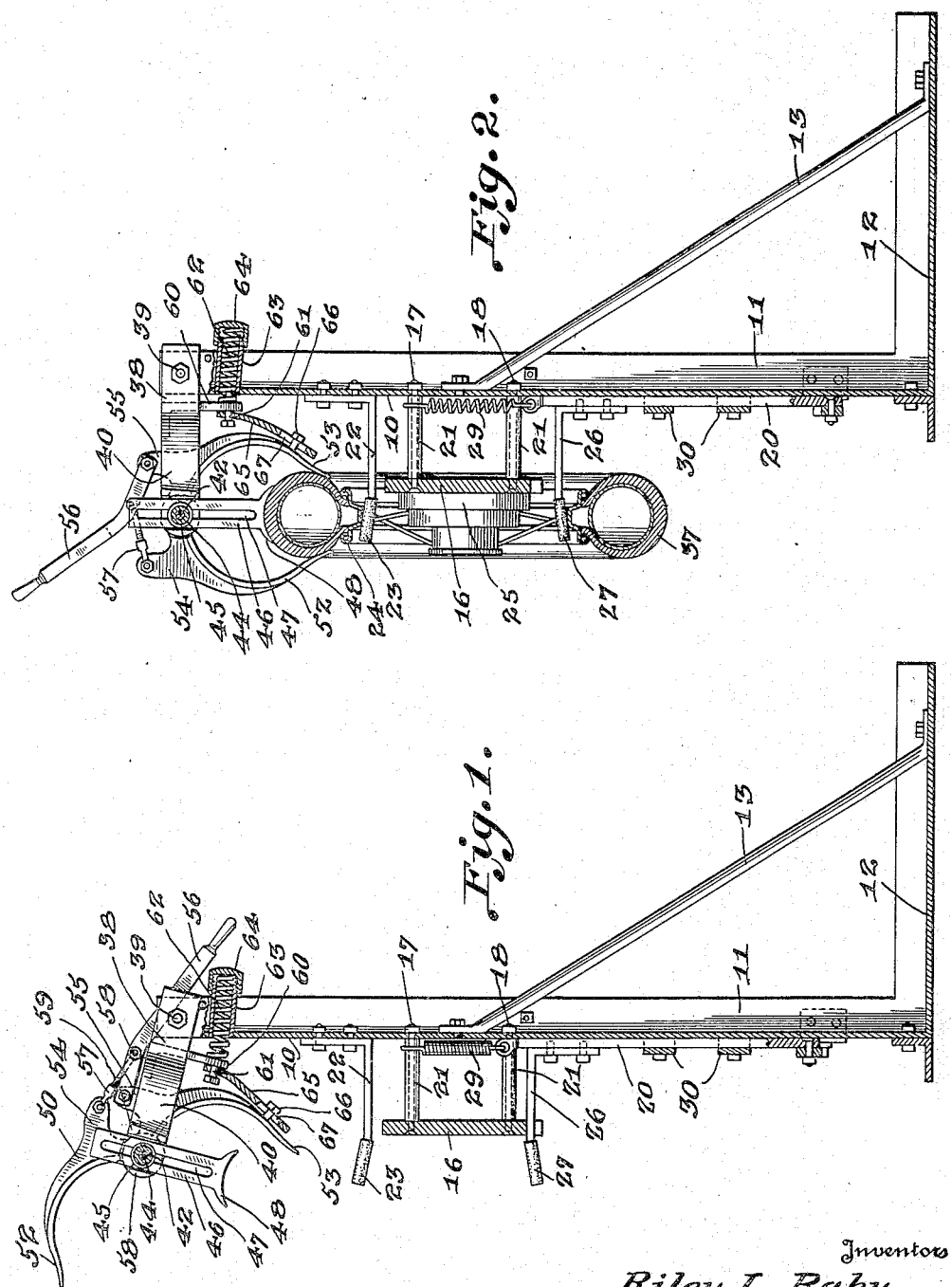
Inventors
Riley L. Raby
AND James A. McKay
By Wilkinson & Mawhinney
Attorneys

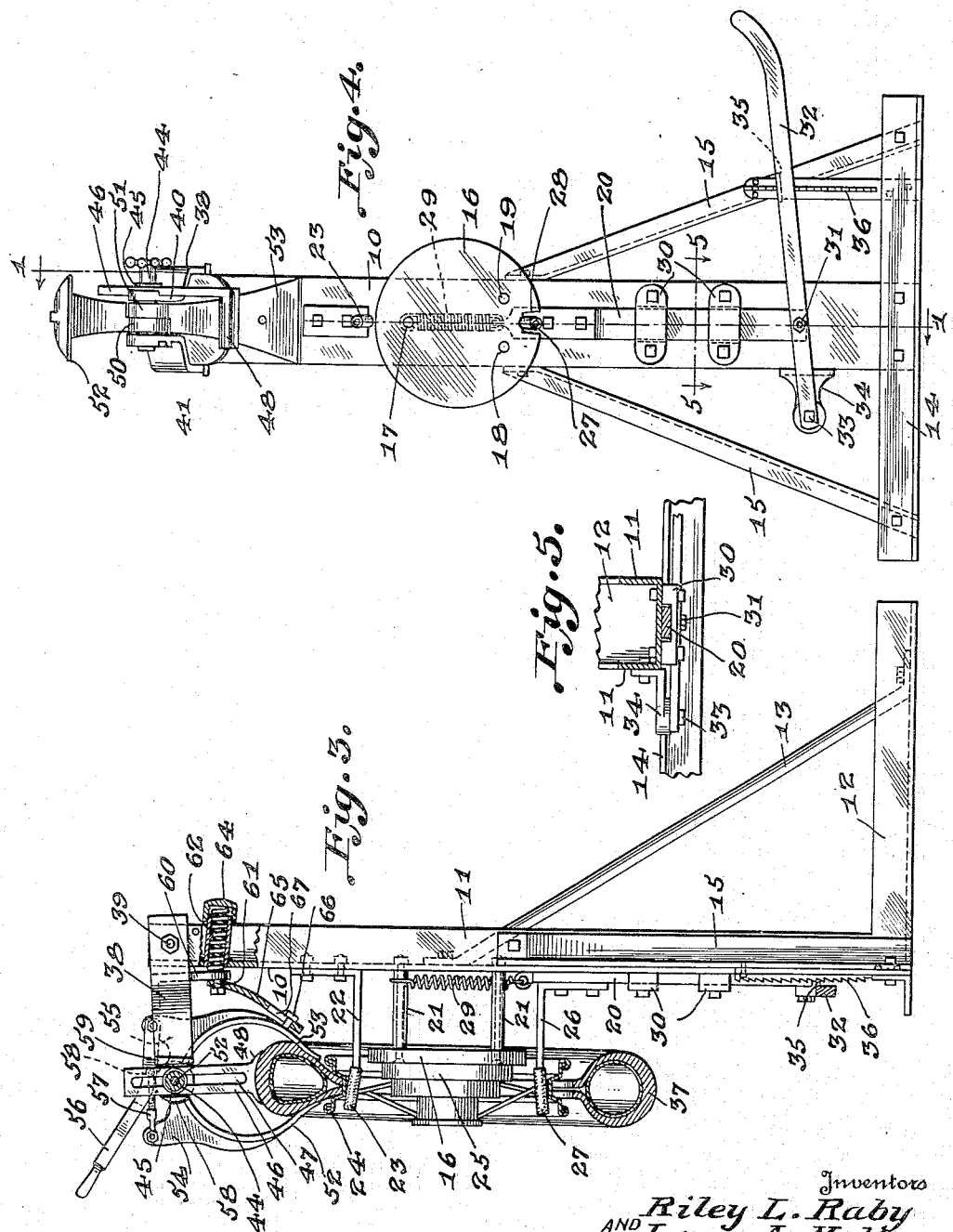

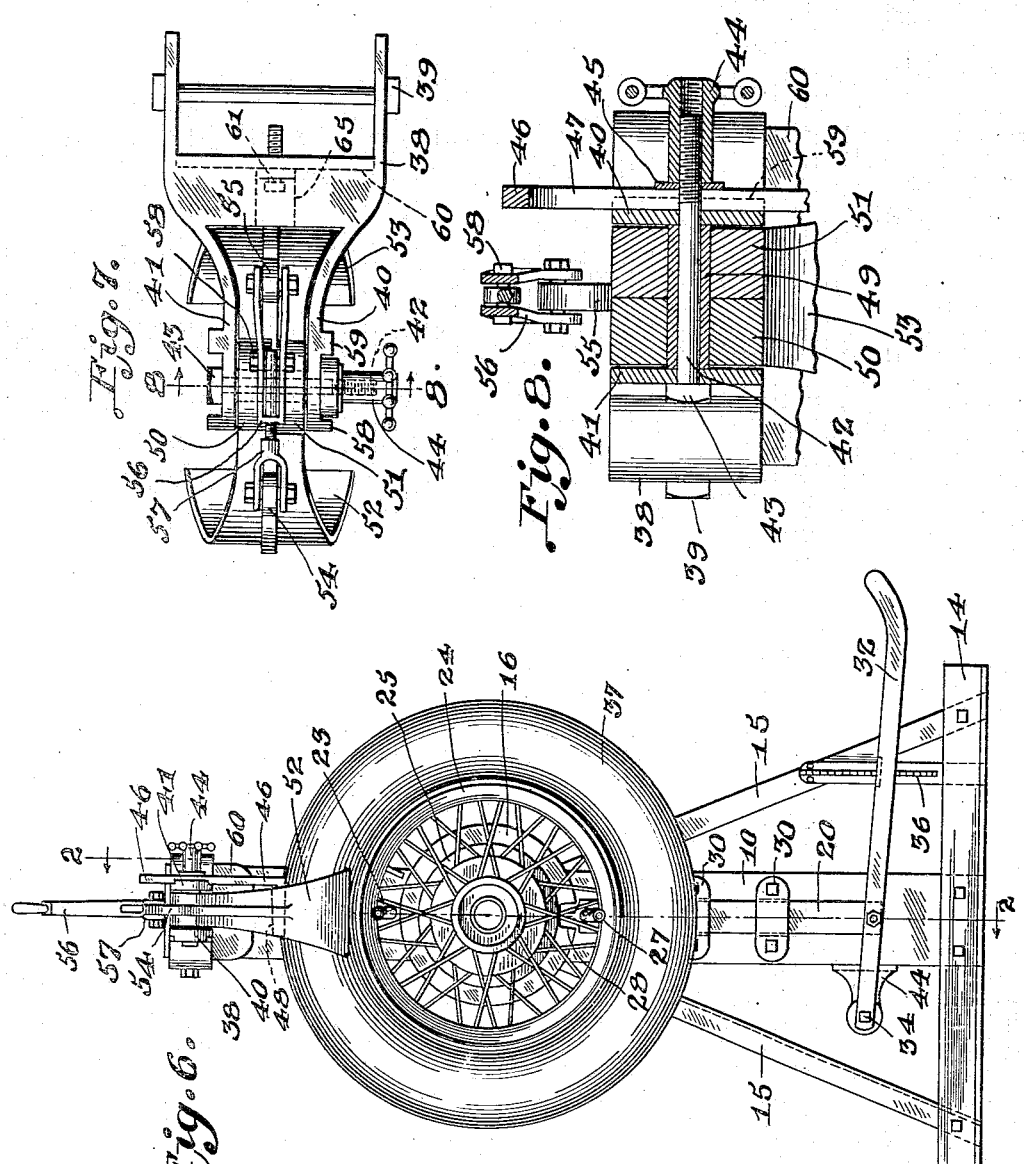

Patented July 17, 1934

1,966,766

UNITED STATES PATENT OFFICE 1,966,766

TIRE CHANGING MACHINE

Riley Lauran Raby and James Arthur McKay, Shelbyville, Tenn., assignors of one-third to Prentice Cooper, Shelbyville, Tenn.

Application April 7, 1933, Serial No. 664,996

7 Claims. (Cl. 157—6)

The present invention relates to improvements in tire changing machines, and more particularly relates to a machine or tool for changing automobile tires on what are known as drop-center wheels.

An important object of the invention is to provide a device which will quickly grip an automobile wheel of any size, and firmly secure same in an easily accessible vertical position where both the top and side portions of the tire may be simultaneously clamped in a manner to permit the tire to drop down into the center channel of the drop-center rim at the upper portion of the wheel and thus enable the tire to be freed from the rim at the lower portion of the wheel.

Another object of the invention is to provide an improved clamping device whereby the two side walls and beads of the tire are forced together and at the same time such device exerts a pushing action downwardly upon the tire to cause the tire to drop into the drop-center channel of the wheel.

A further object of the invention is to provide an improved tire clamp which is simple in construction and capable of easy and quick operation to perform the functions intended.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken on the line 1—1 in Figure 4 with the jaws of the clamp in open position.

Figure 2 is a vertical section taken on the line 2—2 in Figure 6.

Figure 3 is a side elevation with parts broken away and parts shown in section and with the clamp device closed upon the tire.

Figure 4 is a front elevation showing the jaws in open position.

Figure 5 is a transverse horizontal section taken on the line 5—5 in Figure 4.

Figure 6 is a front elevation of the improved machine with the clamping device resting upon a tire, as shown in Figure 2.

Figure 7 is a top plan view of the improved clamp device, and

Figure 8 is a cross section taken on the line 8—8 in Figure 7.

Referring more particularly to the drawings, 10 designates a standard having the rearwardly directed flanges 11 at its opposite edges and being erected upon a base 12 which may also be flanged for strength and reinforcement. A brace 13 is shown as mounted between the standard 10 and the rear portion of the base plate 12.

A strip of angle iron or other material 14 is riveted, bolted or otherwise affixed to the lower portion of the standard and extends to a considerable distance beyond both sides of the standard in order to balance the device and retain the standard in erect position. The outer end portions of the strip 14 are connected by diagonal braces 15 to the side flanges 11 of the standard.

Affixed at an appropriate height upon the standard is a disc or plate 16 held in place by a top bolt 17 and two lower bolts 18 and 19 which are spaced apart to permit the slide 20 to pass therebetween. Spacing sleeves 21 are engaged about the bolts 17, 18 and 19 between the plate 16 and the standard 10 for the purpose of spacing the plate 16 an appropriate distance outward from the standard; it being understood that the bolts 17, 18 and 19 are secured to said standard 10.

The standard also provides support for an upper fixed arm 22 located above the plate 16 and preferably having a rubber or other cushion sleeve 23 on its slightly upturned outer end for the purpose of receiving the drop-center rim 24 of the wheel shown in Figure 3. The brake drum 25 of the wheel is shown as resting against the plate 16 which forms an abutment for the same.

The lower arm 26 has a downturned outer end provided with a rubber or other cushion sleeve 27 for engaging the lower portion of the wheel rim 24. This lower arm 26 is carried by the slide 20 and the disc or plate 16 at its lower portion, shown in Figure 2, is cut away as indicated at 28 to receive the lower arm 26 when the coil spring 29 draws the slide 20 upwardly. The coil spring 29 is affixed to the upper bolt 17 or its sleeve and passes down between the two lower spaced bolts 18 and 19, the lower end of the spring being affixed to the upper end of the slide 20. The slide 20 is guided by the slide bearings 30 in any appropriate number which bearings are affixed to the standard 10. To the lower end of the slide 20 is pivoted, as indicated at 31, to a lever or treadle 32 fulcrumed, as indicated at 33, upon a bracket 34 carried by the standard. As shown to best advantage in Figures 3 and 4 the treadle 32 is provided with a dog or pawl 35 cooperating with the downwardly inclined ratchet teeth 36, which ratchet teeth are affixed to any appropriate support held upon the strip 14 and one of the diagonal braces 15.

The tire which is represented generally at 37 is adapted to be clamped at the upper portion of the wheel by a head clamp. This head clamp is carried upon a bracket 38 pivoted to the upper portion of the standard 10 as upon the pivot bolt 39, and said bracket is formed with supporting arms 40 and 41 which are bifurcated and spaced apart. Through the arms 40 and 41 passes a bolt 42 having a head 43 at one end bearing against one of the arms 41 and a threaded portion upon its other end for engagement by a nut 44. The nut engages a washer 45 which in turn bears against a vertically adjustable leg 46 having a vertically elongated slot 47 through which the bolt 42 passes. The lower portion of the leg carries a foot 48 extending in position to engage the upper tread portion of the tire 37 and the foot is preferably rounded upon its under side, as indicated in Figure 3, in order to conform generally to the curvature of the tire tread portion.

A spacing sleeve 49 surrounds the bolt 42 and engages the inner walls of the arms 40 and 41 to prevent pressure of the nut 45 clamping the arms upon the perforated lugs or hubs 50 and 51 of the clamp jaws 52 and 53. The hubs 50 and 51 are freely pivoted upon the sleeve 49 and such jaws are formed with lugs 54 and 55.

To one of the lugs is pivoted a slotted hand lever 56 and to the other lug is pivoted a link 57 having a turnbuckle therein; and such link being pivoted at 58 in the slot of lever 56. The lever and link thus form a toggle joint. As shown in Figures 7 and 8 the leg 46 is received between flanges 58 and 59 of the arm 40 for the purpose of permitting freedom of vertical movement of said leg 46 but preventing the same from swinging about the bolt 42.

Depending from the bracket 38 is an apron 60 carrying a pin 61 which at one side enters the initial convolutions of a helical spring 62. The spring 62 is confined within a cylindrical housing 63 supported by the standard and having a threaded end cap 64 through which the spring may be introduced and by which the spring may be removed. Such end convolutions of the spring 62 abut yieldingly against the apron 60 and have an inherent tendency to move to the position indicated in Figure 1. The head of the bolt 61 is spaced from the apron 60 in order to accommodate therebetween a slotted equalizing strap 65 which depends alongside the jaw 53 and is coupled to the jaw by a headed pin 66 affixed to the jaw extending through the slot 67 of the strap 65.

In the operation of the device, normally the parts are in the position shown in Figures 1 and 4. It will be noted that the jaws are in open position and that the spring 29 has drawn the slide and the lower arm 26 upwardly. A wheel with a tire thereon to be demounted is lifted by the operator and hung on the upper arm 22. The upwardly curved tip of the arm 22 will cause the wheel to be securely held in position and will have a tendency to cause the brake drum 25 to swing against the abutment plate 16. Then the treadle 32 is depressed by the foot causing the slide 20 to move downwardly and requiring the lower arm 26 to execute a like movement until the downwardly angled part 27 thereof engages the lower part of the drop-center rim, which condition of the parts is shown in Figure 3. By forcing the treadle 32 against the ratchet the slide will be held in the lower position and the wheel firmly and securely held upon the device while the operation of removing and replacing a tire is conducted.

From Figure 1 it will be apparent that in the act of placing the wheel upon the machine that the tire will strike the jaw 53 and cause a swinging of the jaws. With this movement the foot 48 will be brought down upon the tread of the tire, as shown in Figure 3. Then the lever 56 can be swung from the position shown in Figure 1 to that shown in Figure 2 causing the moving of the jaws 52 and 53 together upon the tire.

It will be noted from Figure 2 that the jaws 52 and 53 only lightly touch opposite side walls of the tire, but in Figure 3 the jaws have moved close together, thus squeezing the sides of the tire and the beads together whereby the beads may drop down into the center channel of the rim 24 at the upper portion of the wheel, thus enabling the beads at the lower portion of the wheel to drop free of the rim. In this condition the bottom portion of the tire is grasped and pulled outwardly; thereafter working the tire free of the rim all around. This action is accomplished by further shifting of the lever 56 from the position shown in Figure 2 to that indicated in Figure 3 where the lever has assumed a toggle lock position. The coil spring 62 is compressed to some extent only when the jaw 53 is moved from the position, shown in Figure 1 to the position shown in Figure 2, and this is occasioned by the initial placing of the wheel upon the rack or machine. When both jaws are subsequently brought down upon the tire, as indicated in Figure 2, the spring will be sufficiently strong in its reaction against the apron 60 to maintain the jaws 52 and 53 in substantially the vertical position, shown in this Figure 2.

However when the jaws 52 and 53 are squeezed upon the tire, as shown in Figure 3, and the beads are permitted to descend into the drop-center channel of the rim then the jaws 52 and 53 assume the weight of the tire.

This considerable additional weight develops on the spring 62 thus causing a further compression of the spring and allowing the jaws and their supporting bracket 38 to swing down about the fulcrum 39, thus enabling the beads of the tire to enter the center channel of the rim. The strap 65 has an equalizing action, tending to center the jaws 52 and 53 as for instance to the position shown in Figure 2.

When the tire is sufficiently removed from the rim the lever 56 is thrown back thus opening the jaws and permitting the lifting of the tire off the upper portion of the rim.

It will be noted that the clamping device is adjustable and may be adjusted to fit any size tire, and the adjustment permits the operator to regulate the amount the side walls of the tire may be pressed in, clamped and locked, so as to permit the maximum amount of play between the lower part of the tire and the lower portion of the rim. It is found necessary to regulate the space between the lower extremities of the jaws when the clamping device is closed and locked; in other words, to regulate the amount of pinch, because, when a tire is clamped too tightly, an undesirable upward force is exerted upon the tire which tends to decrease the amount of play at the lower and opposite side of the wheel between the rim and the tire, and thus makes it more difficult to pull the tire off the wheel at the bottom.

Also it, of course, is apparent that unless a tire is clamped tightly enough to permit the beads to drop down into the drop center of the rim and be held firmly against the bottom of the drop center channel, one does not secure the benefit of the maximum amount of play between tire and rim at the lower and opposite portion of the wheel where the maximum amount of play is necessary in order to make it easy to pull the tire off the wheel.

Specifically, this regulation is accomplished in our machine as follows:—

When turn buckle 57 is screwed outwardly so as to lengthen the link, the effect is to shorten the space between the extremities of the clamp when the clamp is closed and locked; and vice versa, when the turn buckle is screwed up so as to shorten the length of the link.

The adjustable clamping device is equipped with the adjustable leg and foot and is thus not only capable of properly clamping a tire with just the right amount of pressure, but, by virtue of said foot, may exert a beneficial downward force on the tire capable of pushing down and holding the beads of the tire firmly down in the drop center channel of the rim. This makes it easier to pull the lower portion of the tire from the rim.

The slot in the strap 65 permits ample play and adjustment of the jaw 53 corresponding with jaw 52. This play and adjustment permits both jaws to have freedom of adjustment so as to fit any size tire upon which it is desired to operate the machine. And in addition to this, this stabilizing strap serves to keep the whole clamping device in place. Were it not for this strap, it would be possible to lift the whole clamping device up and throw it over on the back side of the standard and allow spring 64 to fly from its seat. The strap likewise prevents the clamping device from being pushed in the opposite direction further than is necessary against the standard. In other words, an additional use of the strap is to keep the clamping device from going back too far in either direction. Summing up the purpose of stabilizing strap 65, it may be stated that it is to control the self-centering motion of the clamping device and keep it in place.

Of course the movement of placing a wheel upon the machine will not necessarily cause foot 48 to be brought down upon the tread of the tire, as shown in Figure 3. Instead foot 48 is adjusted on the tread by hand so that when lever 56 is swung from the position shown in Figure 1 to that shown in Figure 2, jaws 52 and 53 move together upon the tire and add to the weight of the clamping device the weight of the tire; thus exerting a beneficial downward force upon the tire. A further pulling down of the lever to the position shown in Figure 3 will cause the beads to drop off the shoulders of the rim down into the drop center channel of the rim, and the weight of the clamping device and tire will be such as to keep the beads held firmly in the channel.

In Figure 3 the jaws are shown as slightly canted to the right but it may be preferable to lengthen the slot 67 downwards so as to permit the jaws to swing about their pivot point 52 to a self-centering position.

It will be appreciated from the foregoing that the operations are simple and can be carried out expeditiously and efficiently.

It is obvious that various changes and modifications may be made in the details of construction and design of the above specifically described embodiment of this invention without departing from the spirit thereof, such changes and modifications being restricted only by the scope of the following claims.

What is claimed is:—

1. In a tire changing machine, a support for holding a wheel and tire in substantially vertical position, a bracket pivotally supported above said support, resilient means for urging said bracket upwardly and away from said support, clamp jaws pivoted on said bracket and adapted to engage opposite side walls of said tire, and means for opening and closing said jaws.

2. In a tire changing machine, a support for holding a wheel and tire in substantially upright position, a bracket pivotally mounted above said support, resilient means for urging said bracket upwardly and away from said support, a pair of clamp jaws pivoted freely in said bracket, means for opening and closing said jaws, and a stabilizing strap connection between said bracket and one of the jaws.

3. In a tire changing machine, a support for holding a wheel and tire in a substantially upright position, a bracket pivoted above said support and having an apron extending downwardly therefrom, a coil spring engaging said apron, a stabilizing strap pivoted to the apron and having a slot therein, a pair of tire clamping jaws freely pivoted to said bracket, one of said jaws having a pin loosely engaging in the slot of said strap, and means for opening and closing said jaws.

4. In a tire changing machine, a support for holding a wheel and tire in a substantially upright position, a pair of freely pivoted clamp jaws above the support, means for manipulating the clamp jaws, and an adjustably supported foot for engaging the tread portion of the tire.

5. In a tire changing machine, a support for holding a wheel and tire in a substantially upright position, a pivoted bracket above the support, jaws pivoted in said bracket, means for manipulating said jaws, a slotted leg vertically adjustable on said bracket but restrained against swinging movement, and a foot on the leg for engaging the tread portion of the tire.

6. In a tire changing machine, a support for a tire and wheel including an upper fixed arm having an upwardly bent end portion on which the wheel may be hung, a substantially vertical abutment plate for receiving the brake drum or hub of the wheel thereagainst, a lower movably mounted arm having a downwardly inclined end portion for engaging the lower part of the wheel, yieldable means tending to draw the lower arm upwardly, and means for forcing the lower arm downwardly and latching the same in the lower adjusted position.

7. In a tire changing machine, a support for a wheel and tire including the base, a standard thereon, upper supporting means fixed to the standard, an intermediate substantially vertical plate fixed to the standard below the upper supporting means, a slide on the standard, spring means for biasing the slide to the upper position, a treadle for lowering the slide, a ratchet for holding the slide in lower position, and an arm on the slide for engaging the lower part of the wheel rim.

RILEY LAURAN RABY.
JAMES ARTHUR McKAY.